2 Sheets--Sheet 1.

S. STEVENSON.
Horse Hay-Rakes.

No. 136,785. Patented March 11, 1873.

Witnesses:
C. A. Bates.
Phil C. Masi.

Inventor:
Stephen Stevenson
Chipman Hosmer & Co.
Attys

2 Sheets--Sheet 2.

S. STEVENSON
Horse Hay-Rakes.

No. 136,785.

Patented March 11, 1873.

WITNESSES.
Villette Anderson.
E. N. Bates.

INVENTOR.
S. Stevenson,
Chipman Hosmer & Co,
Attys.

UNITED STATES PATENT OFFICE.

STEPHEN STEVENSON, OF DANSVILLE, NEW YORK.

IMPROVEMENT IN HORSE HAY-RAKES.

Specification forming part of Letters Patent No. 136,785, dated March 11, 1873.

*To all whom it may concern:*

Be it known that I, S. STEVENSON, of Dansville, in the county of Livingston and State of New York, have invented a new and valuable Improvement in Horse Hay-Rakes; and I do hereby declare that the following is a full, clear, and exact description of the construction and operation of the same, reference being had to the annexed drawing making a part of this specification, and to the letters and figures of reference marked thereon.

Figure 1:
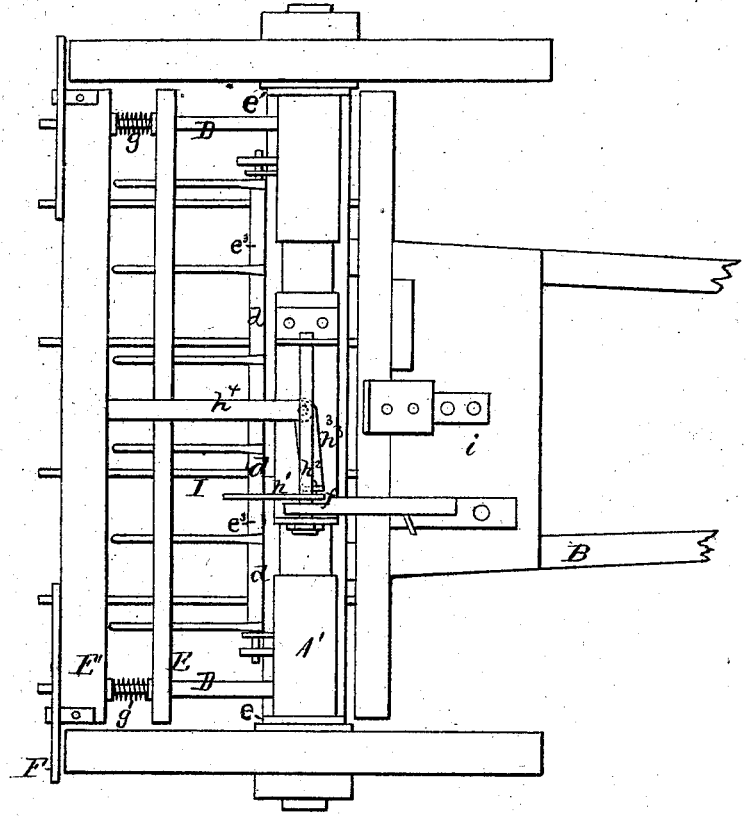
Figure 2:
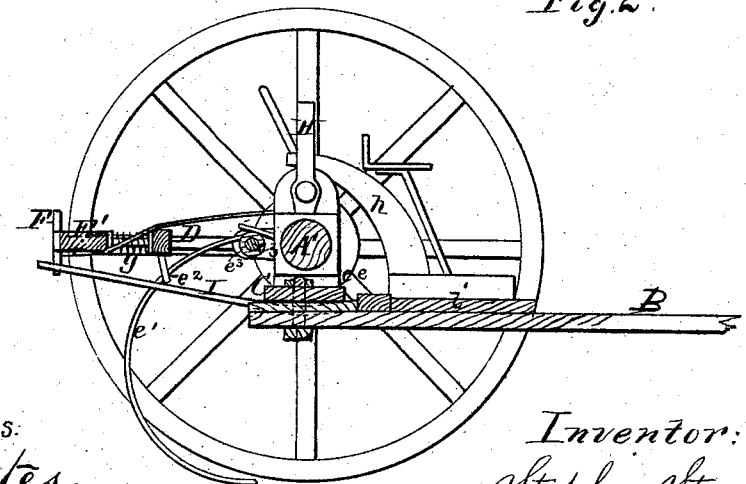
Figure 3:
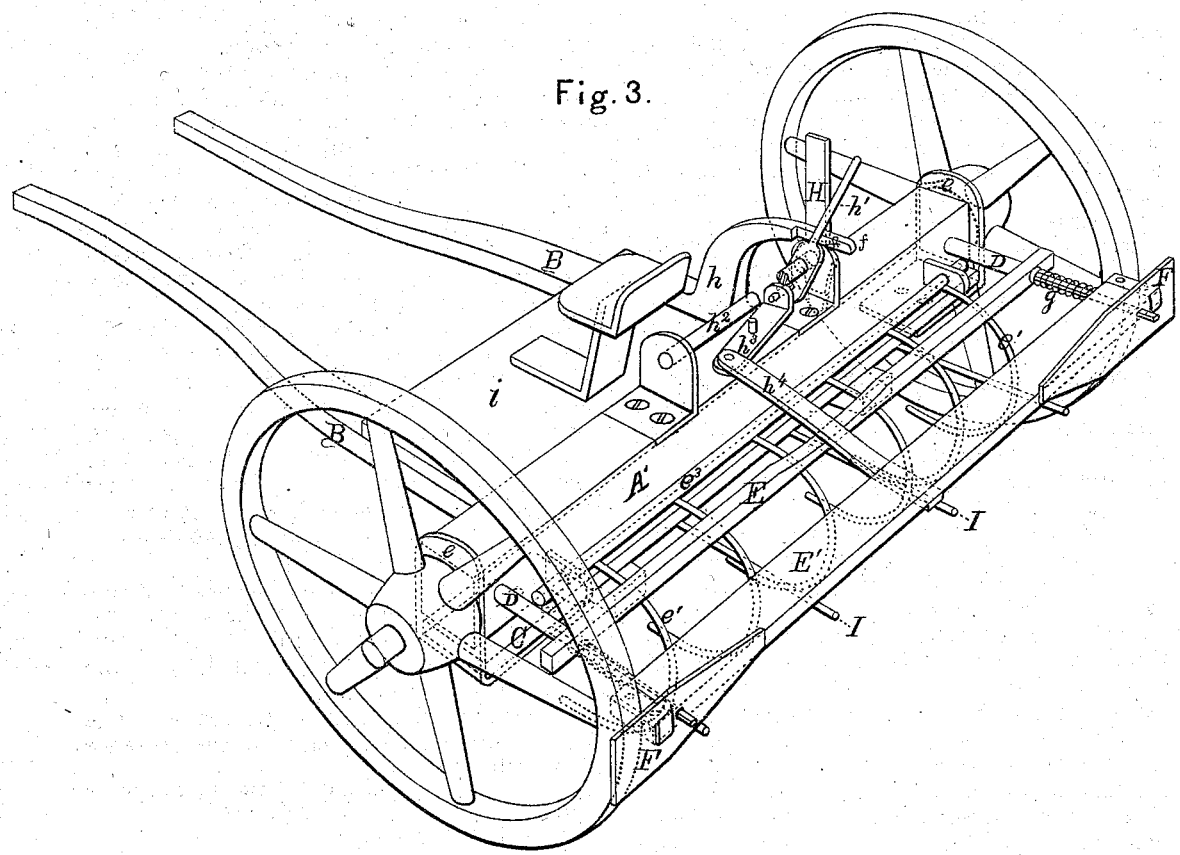

Figure 1 of the drawing is a top view of my horse hay-rake; Fig. 2 is a vertical section of same; and Fig. 3 is a perspective view of my invention.

This invention has relation to horse hay-rakes; and it consists in the construction and novel arrangement of devices for raising and operating the brakes to dump the load, and for holding them at their proper positions, all substantially as hereinafter more fully described.

A' in the drawing represents the axle, to which the thills B are connected by means of a transverse bar, C, running underneath the axle from wheel to wheel, attached to the axle by means of standards $e$ at the ends. The thills are bolted to the bar C, allowing the axle a quarter-turn. D designates rods projecting rearwardly from the axle, and connected by means of the transverse bars E E', to the latter of which, near the ends thereof, are secured the brake-plates F. Between the bars E E' spiral springs $g$ are wound around the arms D, and tend to press the bar E' outwardly from the rim of the wheel. The bar E is provided with staples $e^2$, which support the teeth $e^1$, the latter being pivoted independently to a transverse bar, $e^3$, which is attached to the axle, and held in proper position by means of collars $d$, placed on the bar $e^3$ between their heads. The brakes and their attachments, including the teeth, are raised by turning the axle forward through the medium of a lever, H, attached to the top of the latter. A curved arm, $h$, supported upon the foot-board $i$, retains said lever in position by means of a spring-catch, when the brakes are raised. A lever, $h^1$, pivoted on a bar, $h^2$, attached to the axle, is connected by means of a link, $h^3$, to a bar, $h^4$, which is coupled to the bar E'; hence, when the lever $h^1$ is turned forward and downward the brakes F are brought in contact with the tire of the wheel. An offset, $f$, cut in the upper end of the rack $h$, prevents the accidental operation of the brakes. I designates the guards which prevent the hay from being raised when the teeth are lifted.

What I claim as my invention, and desire to secure by Letters Patent, is—

The levers H $h^1$, rack $h$, and connecting link and bar $h^3$ $h^4$, in combination with the revolving axle A', holding the arms D with brake-bar E' and brake-plate F, substantially as and for the purpose specified.

In testimony that I claim the above I have hereunto subscribed my name in the presence of two witnesses.

STEPHEN STEVENSON.

Witnesses:
C. R. KERN,
JAMES A. YOUNG.